June 26, 1956
O. E. ANDRUS
2,752,308
CATHODICALLY PROTECTED WATER STORAGE
TANK WITH SAFETY SHUTOFF
Filed Aug. 18, 1952
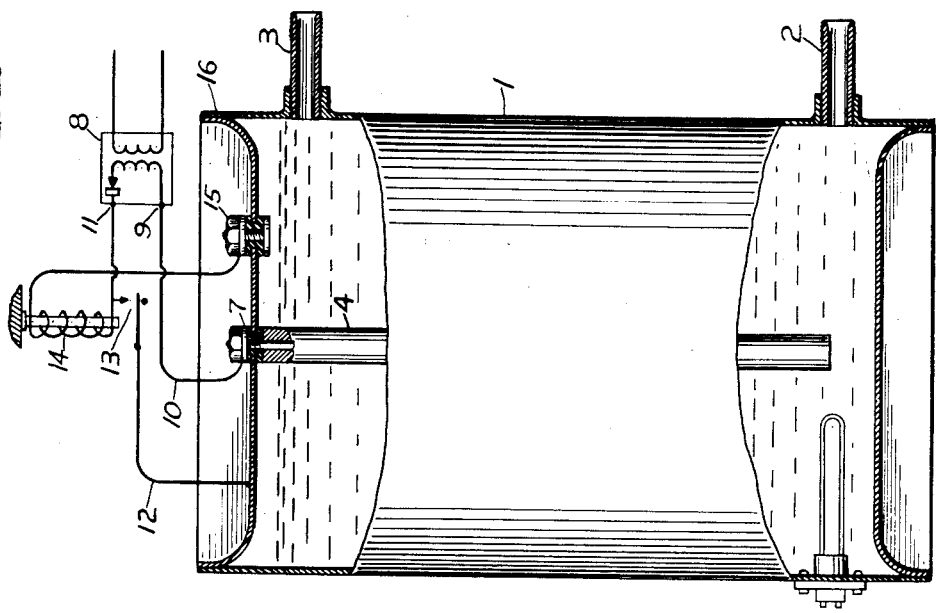
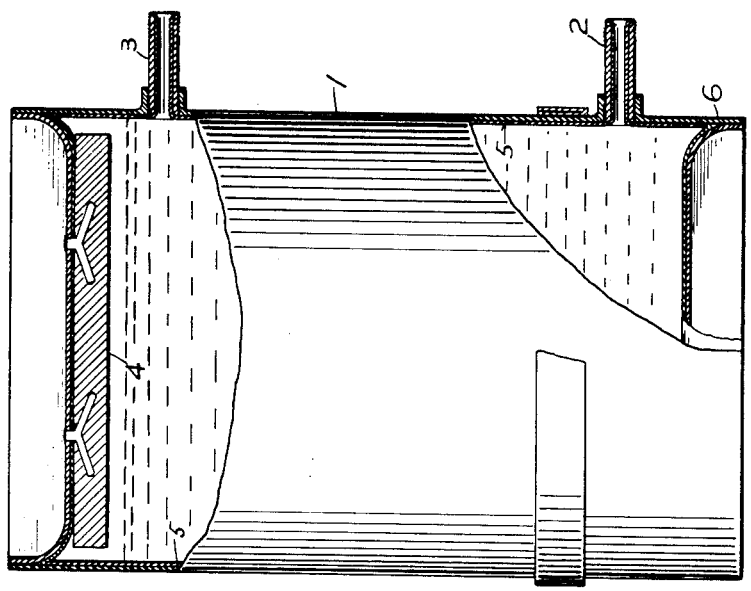
INVENTOR.
ORRIN E. ANDRUS
BY
Andrus & Sceales
ATTORNEYS

United States Patent Office 2,752,308
Patented June 26, 1956

2,752,308

CATHODICALLY PROTECTED WATER STORAGE TANK WITH SAFETY SHUTOFF

Orrin E. Andrus, Milwaukee, Wis., assignor to A. O. Smith Corporation, Milwaukee, Wis., a corporation of New York Application August 18, 1952, Serial No. 305,091

1 Claim. (Cl. 204—196)

This invention relates to a cathodically protected water storage tank with safety shutoff for idle periods in which water is not drawn from the tank.

The invention is particularly applicable to the construction of tanks for domestic hot water heaters and the like.

One of the principal objects of the invention is to limit the accumulation of hydrogen gas at the top of the tank and at the same time prevent slugs of hydrogen from entering the outlet of the tank and passing to the discharge faucet.

Another object of the invention is to reduce the gas storage space necessary at the top of the tank.

Another object is to limit or prevent the formation of excess hydrogen by cathodic protection of the tank.

Another object is to proportion the cathodic protection obtained to the need for protection.

Another object is to reduce or stop anode consumption during periods of idleness of the tank.

Other objects and advantages of the invention are set forth hereinafter.

The invention is illustrated in the accompanying drawings in which:

Figure 1 is a side elevation of a cathodically protected tank with parts broken away and sectioned to show the embodiment of the invention; and Fig. 2 is a similar view of a modified construction employing an electric cut-off for the cathode.

The tank 1 illustrated is generally cylindrical and upright with a suitable inlet opening 2 and outlet opening 3. Where the tank is employed for hot water storage the outlet 3 will generally be near the top of the tank for drawing off the hottest water.

The tank 1 is protected cathodically by means of an anode 4 within the tank and which effects a flow of current to the exposed surface of the tank wall. The amount of current required for cathodic protection of the tank wall will depend largely upon the amount of exposed area of the wall. Where the tank is galvanized its entire surface is in electrical contact with the water inside. Where the tank is lined with glass 5, or a similar water impervious and electrically insulating material, the exposed areas are limited to defects in the lining and to areas at the assembly seams at the top and bottom of the tank, and to pipe connections, and the like.

The cathodic current may be provided by constructing the anode of a less noble metal than the tank wall, such as of magnesium or an alloy thereof, in which case the sacrificial anode should be electrically connected to the tank wall. The cathodic current may be provided by employing a non-sacrificial anode insulated from the tank wall, and by connecting the opposite terminals of a low voltage external direct current source to the tank wall and anode, respectively, to provide current flow within the water from the anode to the cathode.

In the illustration shown in Fig. 1 of the drawing the anode 4 is of the sacrificial type and is directly secured to the tank wall to provide electrical connection therebetween. The anode 4 of Fig. 2 is of the non-sacrificial type and electrically insulated from the tank wall at the mounting for the anode.

The flow of cathodic protection current to the cathode generates hydrogen at the surface of the cathode. Where a sacrificial anode is employed additional hydrogen may be generated by local chemical and galvanic attack upon the surface of the anode.

Where water is not withdrawn from the tank and replaced frequently it is possible for more hydrogen to be generated than will be absorbed in the water, in which case hydrogen gas will collect at the top of the tank.

According to the present invention the amount of excess hydrogen collected at the top of the tank is limited to a predetermined storage space by stopping the action which generates hydrogen after filling of such predetermined space.

In the case of the sacrificial anode, as shown in Fig. 1, the anode is made in the form of a flat disc of a diameter near to the inside diameter of the tank and having a suitable thickness to provide adequate useful life for the anode. The anode 4 of Fig. 1 is located horizontally at the top of the tank, and the outlet 3 for the tank is disposed below the anode.

In the construction of Fig. 1 accumulation of hydrogen gas at the top of the tank above outlet 3 and around anode 4 lowers the water level in the tank, and when the water level gets below the anode 4 all further hydrogen evolution stops due to cutting off of the cathodic protection currents and of all local attack upon the anode.

Upon a resumption of use of the water in the tank, fresh water coming into the tank will gradually absorb the hydrogen at the top of the tank and let the water level rise until the water contacts the bottom of the anode, whereupon the cathodic protection currents will again flow.

Where the anode 4 serves as the automatic shutoff for cathodic action, as described above, the tank should be lined with a suitable water impervious electrically insulating lining such as glass 5 in order to minimize the cathode areas to substantially less than the surface area of the anode and effect adequate cathodic protection for defects at the bottom of the tank as at the lower circumferential assembly seam 6 for the tank.

The anode 4 may be of the non-sacrificial type, in which case it should be insulated from the tank wall and supplied with current from a suitable external source.

In the construction of Fig. 2 a non-sacrificial anode 4 is suspended within the tank by a fitting 7 which insulates the same from the tank wall. A transformer rectifier unit 8 or other suitable source of low voltage direct current has its positive terminal 9 connected by lead 10 to anode 4 and its negative terminal 11 connected to the tank wall by lead 12.

A relay switch 13 serves to interrupt the flow of current from the tank 1 through the lead 12 when a predetermined amount of hydrogen accumulates in the top of the tank above the outlet 3. For this purpose the electromagnet 14 of relay switch 13 may be energized from the unit 8 by a circuit which includes anode 4 and a small control electrode 15 extending through the top of the tank and insulated therefrom.

When the water level in the tank of Fig. 2 lowers out of contact with control electrode 15, current flow discontinues between anode 4 and electrode 15 and electromagnet 14 becomes de-energized, permitting the contacts of relay 13 to open and discontinue the cathodic protection currents.

Upon rising of the water level in the tank into contact with control electrode 15, electromagnet 14 will again be energized and relay 13 will close to again establish the flow of cathodic protection currents through the water from anode 4 to the exposures on the tank wall.

In the embodiment of Fig. 2 the anode 4 may be rod-shaped and may extend vertically in the tank for nearly the full height of the tank to accomplish adequate distribution of the protective current on cathode exposures, particularly when the exposed area is relatively large, as when the insulating lining is quite imperfect or even lacking.

During the infrequent periods of shutoffs of cathodic protection as described above, there is very little tendency for corrosion of the tank wall, since the hydrogen previously produced has neutralized much or all of the available free oxygen present in the water prior to saturation of the water with hydrogen and collection of excess gas at the top of the tank. When fresh water comes into the tank to replace water drawn off it is mixed by reason of mechanical and thermal movement with hydrogen saturated water and sufficient hydrogen gas is dissolved to allow water to contact the control cathode 15 and to resume the flow of current for cathodic protection. As normal withdrawals are continued, the reservoir of hydrogen gas above outlet 3 disappears as the hydrogen dissolves in the water passing through the heater.

Although the invention has been illustrated and described as applied to a water storage heater it is also applicable to any tank or vessel in which water may be treated in various ways other than by being heated, and the term water storage tank includes such tanks or vessels.

Various embodiments of the invention may be employed within the scope of the accompanying claim.

I claim:

A water storage unit comprising a closed metal tank having inlet and outlet openings with the outlet opening being located at all times during the operation of the storage unit below the level of water in the tank and adjacent the top of the tank, an anode disposed within the tank and insulated therefrom, means to impress a potential dfference between the anode and the tank wall to provide a current flow from the anode through the water in the tank to the tank wall, a control electrode disposed in the top of said tank and insulated therefrom, means connecting said control electrode in series with said anode in an electrical circuit, and a relay switch in the circuit of said first named means and having its energizing coil connected in series circuit with said control electrode to be energized by flow of current therein, whereby when the water level in said tank drops below said control electrode the relay coil is de-energized and the flow of current from the anode to said tank wall is interrupted by said relay switch.

References Cited in the file of this patent

UNITED STATES PATENTS

| | | |
|---|---|---|
| 1,147,989 | Towne | July 27, 1915 |
| 1,401,035 | Boisen | Dec. 20, 1921 |
| 1,796,715 | Kirkaldy | Mar. 17, 1931 |